United States Patent

Bentmar et al.

[11] Patent Number: 6,071,576
[45] Date of Patent: Jun. 6, 2000

[54] LAMINATED PACKAGING MATERIAL, A METHOD OF PRODUCING THE MATERIAL, AND A PACKAGING CONTAINER PRODUCED FROM THE MATERIAL

[75] Inventors: Mats Bentmar, Svedala; Mikael Berlin, Lund, both of Sweden

[73] Assignee: Tetra Laval Holdings & Finance S.A., Pully, Switzerland

[21] Appl. No.: 09/051,679

[22] PCT Filed: Oct. 17, 1996

[86] PCT No.: PCT/SE96/01320

§ 371 Date: Apr. 14, 1998

§ 102(e) Date: Apr. 14, 1998

[87] PCT Pub. No.: WO97/14629

PCT Pub. Date: Apr. 24, 1997

[30] Foreign Application Priority Data

Oct. 20, 1995 [SE] Sweden .................................. 9503695

[51] Int. Cl.[7] ................. B32B 9/02; B32B 9/04; B32B 29/00; B32B 9/06
[52] U.S. Cl. .................. 428/34.2; 428/36.6; 428/36.7; 428/533; 428/537.5; 427/209; 427/358; 427/411; 264/515
[58] Field of Search .................. 428/34.2, 36.6, 428/36.7, 537.5, 533, 121; 427/395, 333, 337, 338, 372.2, 391, 393.4, 395.394, 396, 411, 209, 358; 264/514, 515

[56] References Cited

U.S. PATENT DOCUMENTS 4,789,575 12/1988 Gibbons et al. .................. 428/34.2
5,658,622 8/1997 Berlin et al. ..................... 428/34.2

FOREIGN PATENT DOCUMENTS 0 085 919 A1 8/1983 European Pat. Off. .
0 598 468 A1 5/1994 European Pat. Off. .

Primary Examiner—Ellis Robinson
Assistant Examiner—John J. Figueroa
Attorney, Agent, or Firm—Burns, Doane, Swecker & Mathis, L.L.P.

[57] ABSTRACT

The disclosure relates to a laminated packaging material (10) comprising a core layer (11) of paper or paperboard and a layer (12) of polyvinyl alcohol serving as oxygen gas barrier on one side of the core layer. In order to avoid excessively large quantities of polyvinyl alcohol on application of the oxygen gas barrier layer (12), a layer (13) is applied which serves as a binder and consists of a mixture of polyvinyl alcohol and a gel-forming substance, for example agar, between the polyvinyl alcohol layer (12) and the core layer (11), with the aid of which excessive penetration of polyvinyl A alcohol into the core layer (11) is effectively counteracted, at the same time as the applied binder layer (13) smoothes and evens out the coarse surface structure of the core layer (11) and forms a smooth substrate for the polyvinyl alcohol layer (12). The quantity of gel-forming substance in the binder layer (13) may amount to between 1 and 20 per cent of the total weight of the mixture.

20 Claims, 2 Drawing Sheets

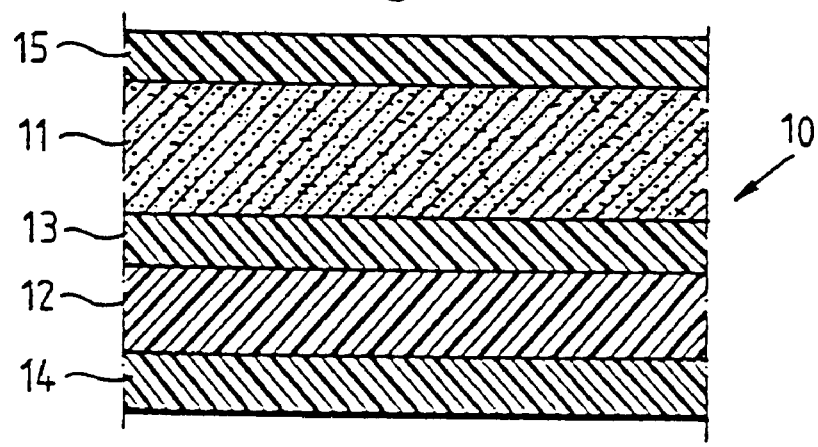
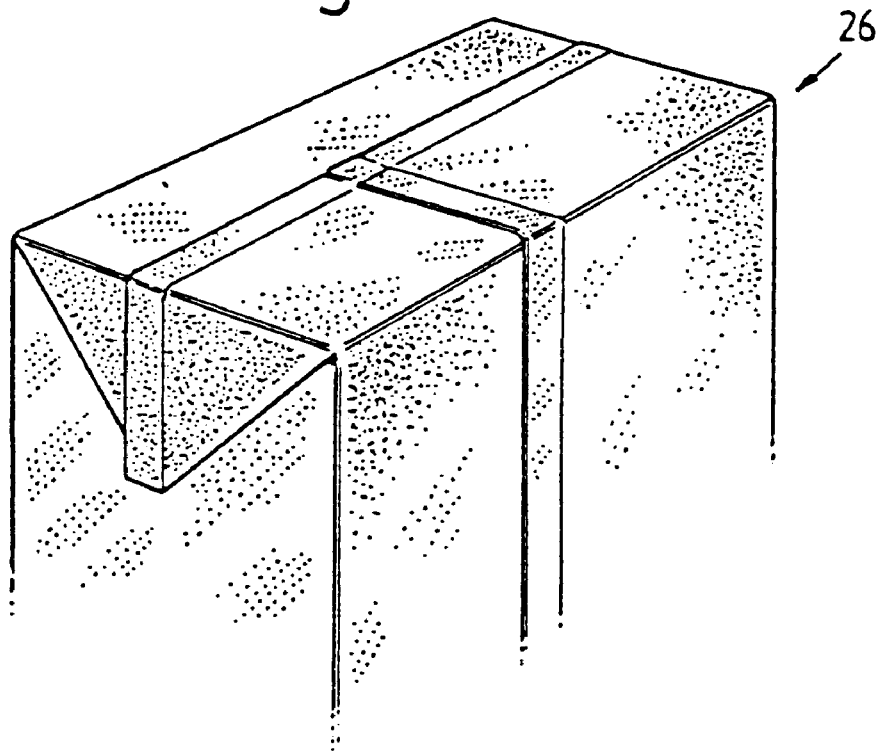

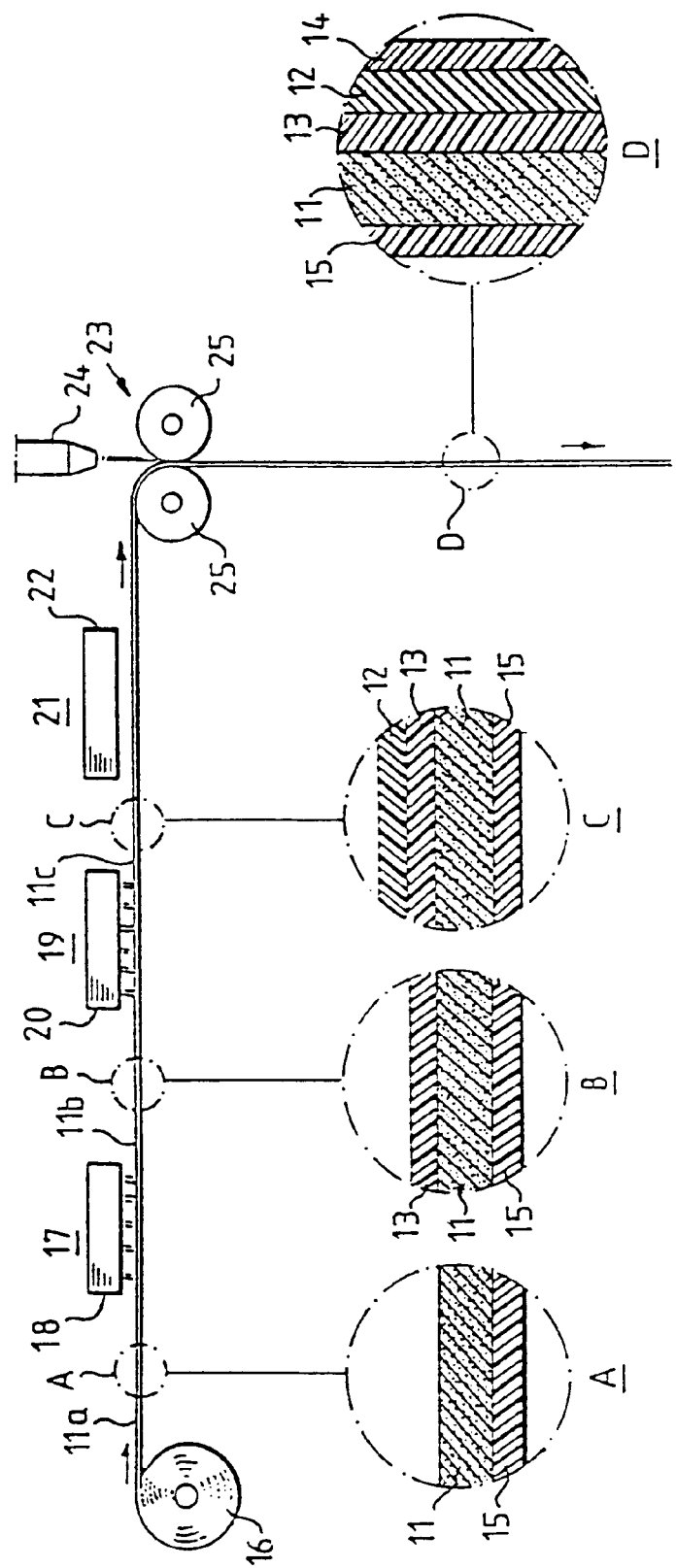

LAMINATED PACKAGING MATERIAL, A METHOD OF PRODUCING THE MATERIAL, AND A PACKAGING CONTAINER PRODUCED FROM THE MATERIAL

BACKGROUND OF THE INVENTION

1. Field of the Invention

The present invention relates to a laminated packaging material for a configurationally stable, liquid-tight packaging container possessing superior oxygen gas barrier properties, the packaging material having a configurationally rigid, but foldable core layer of paper or paperboard, and a layer of polyvinyl alcohol applied as oxygen gas barrier on one side of the core layer. The present invention also relates to a method of producing the laminated packaging material, as well as configurationally stable, liquid-tight packaging containers possessing superior oxygen gas barrier properties produced from the laminated packaging material.

2. Description of the Related Art

Within the packaging industry, liquid foods are nowadays often packed and transported in consumer packages of the single-use type, and a large group of these so-called disposable packages is produced from a laminated packaging, material (packaging, laminate) of the type which has a mechanically stable core layer of paper or paperboard, and outer liquid-tight coatings of plastic, preferably polyethylene, applied on both sides of the core layer.

The point of departure for the composition of the laminated packaging material is to afford the packed product the best possible production protection properties, at the same time as it must be easy to produce, from such packaging material, packaging containers which in turn must be both convenient and easy to handle ('consumer friendly').

A conventional packaging laminate consisting solely of paper or paperboard and plastic, as described above, makes possible the production of configurationally stable, liquid-tight packaging containers but lacks oxygen gas barrier properties and cannot therefore be used for packaging and transporting oxygen gas sensitive products without first being modified or supplemented.

From, for example, Swedish Patent No. 440 519, it is previously known to supplement the above-described plastic coated paper or paperboard material with the desired oxygen gas barrier properties by incorporating into the laminated packaging material a layer of polyvinyl alcohol which constitutes but one of numerous other known examples of so-called barrier materials possessing superior tightness properties vis-à-vis oxygen gas.

According to Swedish Patent No. 440 519, the supplementary polyvinyl alcohol layer is applied by coating or other form of covering operation of an aqueous emulsion of polyvinyl alcohol on one side of a paper or paperboard web which thereafter, together with the applied aqueous polyvinyl alcohol layer, is dried so as to adjust the moisture content of the polyvinyl alcohol layer (and thereby its degree of efficiency as an oxygen gas barrier). Finally, the thus moisture content adjusted polyvinyl alcohol layer is covered with a thin, liquid-tight thermoplastic coating, preferably polyethylene, which is extruded on the polyvinyl alcohol layer for the purpose of protecting the polyvinyl alcohol layer against the penetration of moisture and wet which would drastically weaken the oxygen gas barrier properties of the polyvinyl alcohol layer. Liquid-tight plastic coatings of polyethylene moreover possess the advantage that they render the thus produced packaging material sealable by conventional heat sealing.

In order to ensure that the applied aqueous polyvinyl alcohol layer, after drying, forms a continuous polyvinyl alcohol layer on the paper or paperboard web, the aqueous polyvinyl alcohol emulsion should, according to Swedish Patent No. 440 519, also contain a thickening agent which aids in increasing the viscosity of the aqueous emulsion and thereby counteracts the tendency of the aqueous emulsion to penetrate into the liquid-absorbent paper or paperboard substrate.

While the problem of penetration of polyvinyl alcohol into the absorbent paper or paperboard layer may be solved to some degree by the viscosity-increasing addition of a thickening agent to the aqueous polyvinyl alcohol emulsion, as proposed in Swedish Patent No. 440 519, it is nevertheless necessary that the aqueous polyvinyl alcohol emulsion be applied in an excessively large coating quantity in order to ensure the integrity of the dried polyvinyl alcohol layer.

The problem of excessive coating quantities as required in the prior art technique is partly linked to the fact that the paper or paperboard web is not entirely smooth and even but has an irregular and uneven surface structure (or coarseness) which must be "filled out" in order to form the desired smooth substrate surface for the polyvinyl alcohol emulsion.

Alternatively, this problem may be avoided by employing a smoother and more even paper or paperboard quality as starting material, but such qualities are much more expensive than conventional packaging qualities, and would render production of the laminated packaging material considerably more expensive.

OBJECTS AND SUMMARY OF THE INVENTION

One object of the present invention is therefore to realise a novel, laminated packaging material of the type described by way of introduction without the attendant problems of the type which are linked to the prior art technique.

A further object of the present invention is to realise such a laminated packaging material in which the polyvinyl alcohol layer applied as oxygen gas barrier is both blanket covering and continuous, without requiring excessive coating quantities.

A particular object of the present invention is to realise such a laminated packaging material in which the thickness of the polyvinyl alcohol layer is, in all essentials, independent of the paper or paperboard quality employed.

These objects will be attained according to the present invention by means of a laminated packaging material possessing the characterizing features as set forth in the appended claims.

By suitable regulation of the composition in the interjacent layer, in particular the concentration or concentration gradient of polyvinyl alcohol in the thickness direction of the layer, in combination with suitably selected conditions and methods in the application of the interjacent layer on the paper or paperboard web, unevenness and irregularities in the coarse paper or paperboard surface will be filled out and substantially completely smoothened by the gel-forming component in the interjacent layer. The gel-forming component thus forms an even and smooth subjacent surface for the interjacent layer, at the same time as it effectively prevents the polyvinyl alcohol component in this layer from penetrating into and impregnating the paper or paperboard layer, as is the case in the prior art packaging laminate according to Swedish Patent No. 440 519. At the same time as previously unnecessarily exaggerated coating quantities may thereby be effectively eliminated, the polyvinyl alcohol layer applied as oxygen gas barrier may thus be made very thin, but still continuous and blanket-covering, regardless of the selected quality of paper or paperboard.

According to one preferred embodiment of the laminated packaging material of the present invention, the interjacent layer of gel-forming substance and polyvinyl alcohol has a polyvinyl alcohol concentration in the thickness direction of the interjacent layer which increases in a direction from the core layer to the polyvinyl alcohol layer, whereby loss of polyvinyl alcohol arising out of penetration into the paper or paperboard layer may be further reduced, at the same time as the bonding or adhesive strength between the interjacent layer and the polyvinyl alcohol layer may further be increased because of the elevated polyvinyl alcohol concentration in the binding portion of the interjacent layer.

Preferably the concentration gradient of polyvinyl alcohol is regulated in the interjacent layer such that the concentration of polyvinyl alcohol in the contact or interface region with the paper or paperboard surface is substantially equal to zero, while the concentration of polyvinyl alcohol in the contact or interface region with the polyvinyl alcohol layer is substantially equal to 100 per cent.

The gel-forming component in the interjacent layer may be, but need not necessarily be, so-called agar which is a commercially readily available polysaccharide which, in practical experiments according to the present invention, has proved to work functionally and expediently.

According to a further aspect of the present invention, there will further be realised a method of producing the above-described laminated packaging material according to the invention.

According to yet a further aspect of the present invention, there will be realised a configurationally stable, liquid-tight packaging container possessing superior oxygen gas barrier properties, the packaging container being produced by fold formation of a sheet or web-shaped blank of the laminated packaging material according to the present invention which has preferably been provided with decorative artwork and fold crease lines.

BRIEF DESCRIPTION OF THE ACCOMPANYING DRAWINGS

The above-outlined aspects of the present invention will now be described in greater detail hereinbelow, with particular reference to the accompanying Drawings, in which:

FIG. 1 schematically illustrates a cross section through a laminated packaging material according to the invention;

FIG. 2 schematically illustrates a method of producing the packaging material according to the invention, as illustrated in FIG. 1; and FIG. 3 schematically illustrates the upper portion of a conventional, configurationally stable liquid-tight packaging container possessing superior oxygen gas barrier properties, the packaging container being produced from a laminated packaging material according to the present invention.

DESCRIPTION OF PREFERRED EMBODIMENTS

FIG. 1 thus schematically illustrates a cross section of a laminated packaging material (packaging laminate) according to the invention carrying the generic reference numeral 10. The packaging laminate 10 has a configurationally rigid, but foldable core layer of paper or paperboard 11 of optional quality which may, in the present example, be assumed to be (but in practice need not be) a conventional standard quality for packaging purposes. It should be pointed out once again that the present invention is also applicable to "coarser" paper and paperboard qualities than those that are conventionally employed in packaging contexts, and, by and large, the present invention is practically wholly independent of the surface nature of the selected paper or paperboard material quality which may, therefore, be selected optionally.

On one side of the core layer 11, there is disposed a layer of polyvinyl alcohol 12 which serves as oxygen gas barrier and which is bonded with good adhesive strength to the core layer via an interjacent layer disposed between the core layer 11 and the polyvinyl alcohol layer and consisting of a gel-forming substance and polyvinyl alcohol 13 in direct contact with the core layer 11.

The interjacent layer 13 of gel-forming substance and polyvinyl alcohol contains polyvinyl alcohol in a quantity of between 80 per cent and 99 per cent of the weight of the mixture, while, in a corresponding manner, the quantity of the gel-forming substance may vary between 20 per cent and 1 per cent. Preferably, the quantity of the gel-forming (and at the same time viscosity-increasing) substance should be sufficiently high in the interjacent layer 13 to effectively fill out any possible irregularities and unevenness in the coarse surface structure of the paper or paperboard layer 11, for the formation of smooth and even substrate surface for the polyvinyl alcohol layer 12 which is thereby effectively prevented from penetrating into the liquid-absorbent core or fibre layer 11.

According to one preferred embodiment, the interjacent layer 13 should display a declining concentration of gel-forming substance in the thickness direction of the interjacent layer 13 from the paper or paperboard layer 11 to the polyvinyl alcohol layer 12 (in which event the concentration of polyvinyl alcohol in the interjacent layer 13 should correspondingly increase in the thickness direction of the interjacent layer 13 from the paper or paperboard layer 11 to the polyvinyl alcohol layer 12). Preferably, the concentration of gel-forming substance should be substantially equal to zero in the contact or interface region with the polyvinyl alcohol layer 12 and should increase to substantially equal to 100 per cent in the contact or interface region with the paper or paperboard layer 11, while the concentration of polyvinyl alcohol should correspondingly be substantially equal to 100 per cent in the contact or interface region with the polyvinyl alcohol layer 12 and should fall to substantially equal to zero in the contact or interface region with the paper or paperboard layer 11, whereby the polyvinyl alcohol is definitely prevented from penetrating into the absorbent fibre layer 11, at the same time as good adhesive strength between the polyvinyl alcohol layer 12 and the interjacent layer 13 is ensured.

The choice of gel-forming substance in the interjacent layer 13 may, as has been pointed out earlier, vary even though practical experiments according to the present invention have demonstrated that agar (polysaccharide) functions well and expediently and is, at present, the preferred gel-forming substance in this layer. Other examples of commercially available and applicable gel-forming substances may be carragenan, gelatin etc.

Since the oxygen gas permeability in the polyvinyl alcohol layer 12 is greatly dependent upon the moisture content of the polyvinyl alcohol layer and drastically deteriorates in increasing moisture contents in this layer, it is appropriate to cover the polyvinyl alcohol layer 12 with a liquid-tight coating 14 of plastic. The plastic in this coating may, but need not, be a thermoplastic which preferably consists of polyethylene, for example low density polyethylene (LDPE) which is both extrudable and heat-sealable and thereby assists in making the laminated packaging material 10 easy to produce.

In a corresponding manner, the other side of the laminated packaging material 10 may also be covered by a liquid-tight coating of plastic applied on the paper or paperboard layer 11 and similarly consisting of a thermoplastic, preferably polyethylene, for example low density polyethylene (LDPE) which renders both sides of the packaging material 10 sealable to one another by conventional heat sealing.

The thickness of each respective layer in the packaging material 10 in FIG. 1 (not shown to scale) may vary and is not critical to the present invention. Examples of practically applicable thicknesses for each respective layer are 1–10 $\mu$m for the interjacent layer 13; 1–10 $\mu$m for the polyvinyl alcohol layer 12; and 10–60 $\mu$m for the two outer, liquid-tight plastic coatings 14 and 15. The paper or paperboard layer 11 may vary in thickness within broad limits, but is generally between approximately 80 and 500 $\mu$m.

FIG. 2 schematically illustrates a method of producing the packaging laminate 10 as shown in FIG. 1. In order to facilitate a comparison with this FIG., the same reference numerals as in FIG. 1 have been employed for identical or corresponding parts in FIG. 2, in certain cases with the addition of a letter or prima symbol (').

From a magazine reel 16 (to the left in FIG. 2), a web of paper or paperboard 11a is unwound in the direction of the arrow, the web being coated on one side with a liquid-tight coating of plastic 15 as shown on an enlarged scale in the encircled region A at the bottom of the Figure. The plastic coating 15 is preferably a thermoplastic which, in this example, is assumed to be polyethylene, preferably low density polyethylene (LDPE), while the paper or paperboard layer 11a may, as has been pointed out above, be of optional quality.

The plastic-coated paper or paperboard web 11a is led to a coating station at 17 where the non plastic coated side of the paper or paperboard web 11a is coated with an aqueous mixture of gel-forming substance and polyvinyl alcohol which, through a coating or covering operation by means of suitable coating or covering apparatus 18, is applied in the form of a thin continuous layer 13 on the web 11b, as shown on an enlarged scale in the encircled region B at the bottom in FIG. 2. The aqueous mixture of gel-forming substance and polyvinyl alcohol is applied in a quantity of between approximately 10 and approximately 100 g/m².

The concentration of gel-forming substance (and polyvinyl alcohol, respectively) in the aqueous mixture may vary, but is preferably approximately 0.5 to 10 (approximately 99.5 to 90, respectively). Furthermore, the conditions in the covering or coating operation are selected in such a manner that the aqueous mixture which is kept at a temperature above the gelling temperature of the gel-forming substance, is caused to gel (harden) by cooling in connection with the application process, as soon as it comes into contact with the paper or paperboard web 11a, which thus ensures that the applied mixture forms a well-integrated, unitary layer 13 which effectively bonds to the paper or paperboard layer 11 without penetrating into it. As was explained above, the layer 13 at the same forms an efficient barrier against the penetration of polyvinyl alcohol into the liquid-absorbent paper or paperboard layer 11, whereby the quantity of polyvinyl alcohol which is applied in subsequent covering or coating operations may be considerably reduced as compared with the prior art as described in accordance with Swedish Patent No. 440 519.

Examples of gel-forming, substances which may be employed in the present invention are agar which is a commercially available polysaccharide which has proved to function well in practical experiments. Other commercially available gel-forming substances, such as for example carragenan and gelatin are also usable according to the present invention.

One practical example of an aqueous mixture of gel-forming substance and polyvinyl alcohol contains agar as the gel-forming substance, the concentration of agar optionally varying between approximately 0.5 and approximately 5 per cent.

The coated paper or paperboard web 11b is led further from the covering or coating station 17 to a second covering or coating station at 19 where the gelled layer 13 of the web 11b comprising the gel-forming substance (agar) and polyvinyl alcohol is covered with a layer of aqueous polyvinyl alcohol 12 which is applied through a covering or coating operation by means of a suitable covering or coating apparatus 20 for the formation of the layer 12 acting as oxygen gas barrier, as shown on an enlarged scale in the encircled region C at the bottom in FIG. 2. Because of the previously applied layer of agar and polyvinyl alcohol which forms a uniform substrate surface for the aqueous polyvinyl alcohol layer 12, the aqueous polyvinyl alcohol layer 12 may be applied in small quantities without the risk of penetration of polyvinyl alcohol into the liquid-absorbent paper or fibre layer 11, at the same time as the polyvinyl alcohol layer 12 retains good integrity and covers the entire side of the web 11b. Preferred coating or covering quantities for the aqueous polyvinyl alcohol layer are approximately 10–100 g/m².

After the covering or coating station 19, the coated paper or paperboard web 11c is led to a drying station at 21 where the web 11c is dried by means of a suitable drying apparatus 22 for adjusting the moisture content in the applied polyvinyl alcohol layer 12.

After the drying operation, the dried web 11c is finally led to an extrusion station at 23 where the web is coated with a thin, liquid-tight coating of plastic, preferably polyethylene, such as low density polyethylene (LDPE) which is extruded in the form of a continuous, well-covering film 14 over the dried polyvinyl alcohol layer of the web, by means of an extruder 24, at the same time as the web is led through the nip between two rotating cooling rollers 25 for the formation of the finished packaging laminate 10 as shown on an enlarged scale in the encircled region D in FIG. 2.

While both of the coating or covering stations 17 and 19 are shown as separate stations, it is possible according to the present invention to carry out each respective coating or covering operation in a combined coating or covering operation employing a common apparatus. Examples of such a common coating or covering apparatus may be a double extruder with two flat gap shaped nozzles disposed after one another in the direction of movement of the web, in which event the aqueous mixture of gel-forming substance and polyvinyl alcohol is extruded through the one nozzle (upstream), while the aqueous polyvinyl alcohol solution is extruded through the second (downstream) nozzle.

From the thus produced packaging laminate, there are produced configurationally stable, liquid-tight packaging containers 26 of, for example, the conventional type (Tetra Brik®) whose upper portion is schematically illustrated in FIG. 3. Such so-called single use disposable packages are produced from a pre-creased web of the packaging laminate (preferably provided beforehand with decorative artwork), with the aid of rapid, modern packaging and filling machines of the type which forms, fills and seals finished packages. From the web, the packages are produced in that the web is reformed into a tube by sealing of both of the longitudinal edges of the web into an overlap joint or seam. The tube is filled with the relevant contents and is separated into closed, individual packages by repeated heat sealing of the tube in transverse sealing zones, transversely across the longitudinal direction of the web and beneath the level of the contents in the tube. The packages are finally separated from one another by incisions in the transverse sealing zones and are given the desired geometric, normally parallelepipedic final form by a final fold forming and sealing operation.

Thus, the present invention realises both a packaging laminate and a method of producing the packaging laminate employing already available technology and equipment, but using considerably lesser quantities of polyvinyl alcohol than are required in the prior art technique. Moreover, the present invention realises configurationally stable, liquid-tight and easily produced packaging containers possessing superior oxygen gas barrier properties for packing and transporting liquid foods or other oxygen gas sensitive products.

While the present invention has been described in greater detail in the foregoing with reference to embodiments specifically shown on the Drawings, it will be obvious to a person skilled in the art that different modifications and variations may be made without departing from the spirit and scope of the inventive concept as this is defined in the appended Claims.

What is claimed is:

1. A laminated packaging material for a configurationally stable, liquid-tight packaging container possessing superior oxygen gas barrier properties, the packaging material having a configurationally rigid, but foldable core layer of paper or paperboard, and a layer of polyvinyl alcohol applied as oxygen gas barrier on one side of the core layer, wherein the polyvinyl alcohol layer is bonded to the core layer through an interjacent layer applied between the core layer and the polyvinyl alcohol layer and consisting a mixture of a gel-forming substance and polyvinyl alcohol, wherein said gel-forming substance effectively prevents said polyvinyl alcohol from penetrating and impregnating said core layer.

2. The packaging material as claimed in claim 1, wherein the interjacent layer of gel-forming substance and polyvinyl alcohol is bonded directly to the surface of the core layer without penetration of polyvinyl alcohol into the core layer.

3. The packaging material as claimed in claim 1, wherein the interjacent layer of gel-forming substance and polyvinyl alcohol contains gel-forming substance in a quantity of between 1 and 20 percent of the total weight of the mixture.

4. The packaging material as claimed in claim 1, wherein the interjacent layer of gel-forming substance and polyvinyl alcohol displays a concentration gradient of polyvinyl alcohol, the concentration of polyvinyl alcohol increasing in a direction from the core layer to the polyvinyl alcohol layer.

5. The packaging material as claimed in claim 4, wherein the concentration of polyvinyl alcohol is substantially equal to zero in the contact or interface region of the interjacent layer with the core layer, while the concentration of polyvinyl alcohol is substantially equal to 100 percent in the contact or interface region of the interjacent layer with the polyvinyl alcohol layer.

6. The packaging material as claimed in claim 1, wherein the gel-forming substance is agar.

7. The packaging material as claimed in claim 1, further comprising outer, liquid-tight coatings of plastic on both sides of the packaging material.

8. The packaging material as claimed in claim 7, wherein the outer, liquid-tight plastic coatings consist of a thermoplastic.

9. The packaging material as claimed in claim 8, wherein the thermoplastic in the outer plastic coatings is polyethylene.

10. A method of producing a laminated packaging material according to claim 1, wherein a web of paper or paperboard is coated on its one side with an aqueous mixture of a gel-forming substance and polyvinyl alcohol which is caused to gel on contact with the paper or paperboard web for the formation of a blanket covering layer without penetrating into or impregnating the paper or paperboard web; and that the thus applied layer of the gel-forming substance and polyvinyl alcohol is covered with a layer of aqueous polyvinyl alcohol which is thereafter dried for adjusting the moisture content in the polyvinyl alcohol layer.

11. The method as claimed in claim 10, wherein the aqueous polyvinyl alcohol is applied in connection with or immediately after application of the aqueous mixture of gel-forming substance and polyvinyl alcohol.

12. The method as claimed in claim 10, wherein the produced multilayer structure of paper of paperboard, gel-forming substance and polyvinyl alcohol, and polyvinyl alcohol is coated on both sides with outer, liquid-tight coatings of plastic.

13. The method as claimed in claim 12, wherein both of the outer, liquid-tight plastic coatings are applied by the extrusion of molten plastic.

14. The method as claimed in claim 13, wherein the molten plastic consists of an extrudable thermoplastic.

15. The method as claimed in claim 13, wherein the molten plastic consists of polyethylene.

16. A configurationally stable, liquid-tight packaging container possessing superior oxygen gas barrier properties, produced by fold formation of sheet of web-shaped blank of a laminated packaging material according to claim 1.

17. The packaging material as claimed in claim 1, wherein the interjacent layer consists of a mixture of a gel forming substance and polyvinyl alcohol.

18. The packaging material as claimed in claim 9, wherein the polyethylene is low density polyethylene (LDPE).

19. The method as claimed in claim 15, wherein the polyethylene is low density polyethylene (LDPE).

20. The packaging container as claimed in claim 16, which is provided with decorative artwork and crease lines.

* * * * *